United States Patent
Tanaka et al.

(10) Patent No.: US 12,350,585 B2
(45) Date of Patent: Jul. 8, 2025

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Yasuhiro Tanaka, Tokyo (JP); Shuichi Yamagata, Tokyo (JP); Shohei Sakuraba, Tokyo (JP)

(73) Assignee: CYGAMES, INC., Tokyo (JP)

( * ) Notice: Subject to any disclaimer, the term of this patent is extended or adjusted under 35 U.S.C. 154(b) by 236 days.

(21) Appl. No.: 17/820,170

(22) Filed: Aug. 16, 2022

(65) Prior Publication Data

US 2022/0387889 A1 Dec. 8, 2022

Related U.S. Application Data

(63) Continuation of application No. PCT/JP2021/006781, filed on Feb. 24, 2021.

(30) Foreign Application Priority Data

Feb. 28, 2020 (JP) .................................. 2020-033234

(51) Int. Cl.
*A63F 13/52* (2014.01)
(52) U.S. Cl.
CPC .................... *A63F 13/52* (2014.09)
(58) Field of Classification Search
CPC .......... A63F 13/52; A63F 13/69; A63F 13/35; A63F 13/80; G07F 17/323; G07F 17/326; G07F 17/329
See application file for complete search history.

(56) References Cited

U.S. PATENT DOCUMENTS

2013/0324209 A1 12/2013 Kishimoto et al.
2015/0011281 A1 1/2015 Kishimoto et al.
(Continued)

FOREIGN PATENT DOCUMENTS

JP 5335969 B1 11/2013
JP 2015-027568 A 2/2015
(Continued)

OTHER PUBLICATIONS

International Search Report issued in PCT/JP2021/006781, mailed on May 18, 2021 (3 pages).
(Continued)

*Primary Examiner* — Kevin Y Kim
(74) *Attorney, Agent, or Firm* — Osha Bergman Watanabe & Burton LLP

(57) ABSTRACT

A non-transitory computer readable medium stores a program causing a computer to execute: selectably displaying a plurality of earning games in each of which at least two target objects that can be awarded to a player are set; displaying the at least two target objects of a selected earning game; storing one or more winning-scheduled objects that are selected from the at least two target objects and that are reserved to be awarded to the player, for the selected earning game; indicating the one or more winning-scheduled objects of the selected earning game to the player; and awarding at least one of the one or more winning-scheduled objects to the player by consuming predetermined in-game currency, when an execution operation of the selected earning game is input.

6 Claims, 18 Drawing Sheets

(56) References Cited

U.S. PATENT DOCUMENTS

| | | | |
|---|---|---|---|
| 2015/0165318 A1 | 6/2015 | Yoshikawa et al. | |
| 2016/0035175 A1* | 2/2016 | Kelly | G07F 17/3267 463/19 |
| 2018/0361249 A1 | 12/2018 | Yoshikawa et al. | |
| 2019/0351330 A1 | 11/2019 | Yoshikawa et al. | |
| 2020/0164277 A1 | 5/2020 | Yoshikawa et al. | |

FOREIGN PATENT DOCUMENTS

| | | |
|---|---|---|
| JP | 5819801 B2 | 11/2015 |
| JP | 2019-130279 A | 8/2019 |
| JP | 6612391 B1 | 11/2019 |

OTHER PUBLICATIONS

Written Opinion of the International Searching Authority issued in PCT/JP2021/006781, mailed on May 18, 2021 (4 pages).

Azur Lane; specifications of operational supply and recommended rewards, Winter's Crown [Azurlane], The strategy of Azur Lane(Azurlane) Wiki[online] Jun. 11, 2019, Internet [retrieved on Apr. 27, 2021] <URL:https://game8.jp/azurlane/206799 (8 pages).

Pawapuro; The 4th Box Gacha (Box Gacha) is underway! Collect box tickets at Success and Stadium to win special prizes and 1st prize! You have until the 17th to win tickets! I actually pulled it!; appget[online] Jul. 14, 2017 Internet [retrieved on Feb. 17, 2021] (12 pages).

Office issued in the counterpart Japanese Patent Application No. 2020-033234, mailed on Oct. 13, 2020 (4 pages).

Office issued in the counterpart Japanese Patent Application No. 2020-033234, mailed on Mar. 9, 2021 (4 pages).

Office issued in the counterpart Japanese Patent Application No. 2020-033234, mailed on Jul. 6, 2021 (4 pages).

Office issued in the counterpart Japanese Patent Application No. 2020-033234, mailed on Nov. 16, 2021 (4 pages).

* cited by examiner

MASTER DATA FOR FIRST LOTTERY GAME

| TYPE OF ITEM | SET NUMBER |
|---|---|
| ITEM 1 | 1 |
| ITEM 2 | 1 |
| ITEM 3 | 1 |
| ITEM 4 | 2 |
| ITEM 5 | 3 |
| ITEM 6 | 3 |
| ... | ... |
| ITEM 49 | 10 |
| ITEM 50 | 10 |

FIG.5A

MASTER DATA FOR SECOND LOTTERY GAME

| TYPE OF ITEM | SET NUMBER |
|---|---|
| ITEM 51 | 1 |
| ITEM 52 | 1 |
| ITEM 53 | 1 |
| ITEM 54 | 1 |
| ITEM 55 | 3 |
| ITEM 56 | 3 |
| ... | ... |
| ITEM 149 | 8 |
| ITEM 150 | 10 |

FIG.5B

EARNING DATA FOR FIRST LOTTERY GAME

| TYPE OF ITEM | EARNED NUMBER |
|---|---|
| ITEM 1 | 1 |
| ITEM 2 | 0 |
| ITEM 3 | 1 |
| ITEM 4 | 1 |
| ITEM 5 | 1 |
| ITEM 6 | 0 |
| ITEM 49 | 5 |
| ITEM 50 | 6 |

FIG.6A

EARNING DATA FOR SECOND LOTTERY GAME

| TYPE OF ITEM | EARNED NUMBER |
|---|---|
| ITEM 51 | 1 |
| ITEM 52 | 0 |
| ITEM 53 | 1 |
| ITEM 54 | 1 |
| ITEM 55 | 2 |
| ITEM 56 | 2 |
| ... | ... |
| ITEM 149 | 8 |
| ITEM 150 | 5 |

FIG.6B

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2021/006781, filed on Feb. 24, 2021, which claims priority to Japanese Patent Application No. 2020-033234, filed on Feb. 28, 2020, the entire contents of which are incorporated by reference herein.

BACKGROUND ART

Technical Field

The present invention relates to an information processing program, an information processing method, and an information processing system.

There are conventionally well-known games employing a so-called "gacha", in which items, etc. can be earned by lottery by consuming in-game currency. PTL 1 discloses a box lottery in which the type and number of items that can be earned by lottery are set in advance. In the box lottery, one of the remaining items that have not been earned by a player is determined to be an earned item. Therefore, the player can earn all items by drawing the same number of lotteries as the number of items assigned to the box lottery.

CITATION LIST

Patent Literature

Patent Literature 1: JP 5335969 B

SUMMARY OF INVENTION

Technical Problem

In a typical game, items, etc. that can be earned by a player are periodically added or changed to induce the player to play the earning game in which the player can earn items, etc. However, there is a need to further improve the fun of such an earning game.

An object of the present invention is to provide an information processing program, an information processing method, and an information processing system that can increase the fun of an earning game.

Solution to Problem

In order to solve the above-described problem, an information processing program causes a computer to function as: an earning game display unit for displaying, in a selectable manner, a plurality of types of earning games in each of which at least two objects are set as target objects that can be awarded to a player; a target object display unit for displaying the target objects for each of the earning games; a reservation unit for storing, for each of the earning games, any of the target objects as a winning-scheduled object reserved to be awarded to the player; a suggestion unit for suggesting the winning-scheduled object for each of the earning games; and an object determination unit for determining, on the basis of an input of an execution operation for selecting and executing one of the earning games, at least the winning-scheduled object to be an object that is awarded to the player by consuming predetermined in-game currency.

In addition, the object determination unit may execute a lottery process on the basis of an input of the execution operation, determine a target object won in the lottery process to be a won object, and determine the winning-scheduled object stored before the execution of the lottery process to be an object that is awarded to the player, and the reservation unit may store, as the winning-scheduled object, the won object determined in the lottery process.

In addition, the reservation unit may store a plurality of the winning-scheduled objects in association with winning orders thereof in the lottery process, and the object determination unit may determine the plurality of winning-scheduled objects to be objects that are awarded to the player in order starting from the winning-scheduled object that was won first.

In addition, the type and the number of the target objects may be preset in each of the earning games, and the object determination unit may determine, in the lottery process, the won object from among the target objects, excluding the winning-scheduled objects, that have not been awarded to the player.

In addition, the object determination unit may execute, for the earning games in which the winning-scheduled objects are not stored, a lottery process without consuming the in-game currency and determine a target object won in the lottery process to be a won object, and the reservation unit may store, as the winning-scheduled object, the won object determined in the lottery process.

In order to solve the above-described problem, an information processing method executed by at least one of a game terminal and a server capable of communicating with the game terminal, said information processing method including: a step of displaying, in a selectable manner, a plurality of types of earning games in each of which at least two objects are set as target objects that can be awarded to a player; a step of displaying the target objects for each of the earning games; a step of storing, for each of the earning games, any of the target objects as a winning-scheduled object reserved to be awarded to the player; a step of suggesting the winning-scheduled object for each of the earning games; and a step of determining, on the basis of an input of an execution operation for selecting and executing one of the earning games, at least the winning-scheduled object to be an object that is awarded to the player by consuming predetermined in-game currency.

In order to solve the above-described problem, an information processing system including a game terminal and a server capable of communicating with the game terminal, at least one of said game terminal and said server including: an earning game display unit for displaying, in a selectable manner, a plurality of types of earning games in each of which at least two objects are set as target objects that can be awarded to a player; a target object display unit for displaying the target objects for each of the earning games; a reservation unit for storing, for each of the earning games, any of the target objects as a winning-scheduled object reserved to be awarded to the player; a suggestion unit for suggesting the winning-scheduled object for each of the earning games; and an object determination unit for determining, on the basis of an input of an execution operation for selecting and executing one of the earning games, at least the winning-scheduled object to be an object that is awarded to the player by consuming predetermined in-game currency.

Effects of Disclosure

According to the present invention, the fun of an earning game can be enhanced.

BRIEF DESCRIPTION OF DRAWINGS

FIG. 5A is a drawing for illustrating an example of master data for a first lottery game.

FIG. 5B is a drawing for illustrating an example of master data for a second lottery game.

FIG. 6A is a drawing for illustrating an example of earning data for the first lottery game.

FIG. 6B is a drawing for illustrating an example of earning data for the second lottery game.

DESCRIPTION OF EMBODIMENTS

An aspect of an embodiment according to the present invention will be described in detail below with reference to the accompanying drawings. The values, etc. given in this embodiment are merely examples for facilitating understanding, and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.
(Overall Configuration of Information Processing System S)

Figure 1:
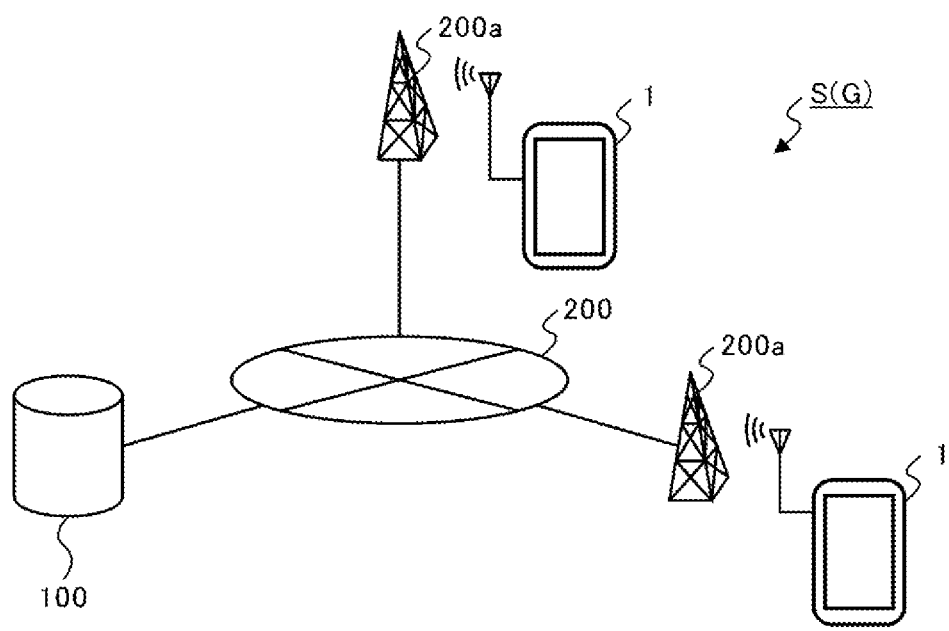
FIG. 1 is an illustration showing a schematic configuration of an information processing system.

FIG. 1 is an illustration showing a schematic configuration of an information processing system S. The information processing system S is what is called a client-server system, including player terminals 1 (game terminals), a server 100, and a communication network 200 having communication base stations 200*a*.

In the information processing system S according to this embodiment, a player terminal 1 and the server 100 function as a game device G. The player terminal 1 and the server 100 individually have assigned thereto roles for controlling the proceeding of the game such that it is possible to proceed with the game through cooperation between the player terminal 1 and the server 100.

Each of the player terminals 1 can establish communication with the server 100 via the communication network 200. The player terminals 1 widely include electronic appliances that can be communicatively connected to the server 100 by wire or wirelessly. Examples of the player terminals 1 include smartphones, mobile phones, tablet devices, personal computers, and game machines. This embodiment will be described in the context of the case where smartphones are used as the player terminals 1.

The server 100 is communicatively connected to the plurality of player terminals 1. The server 100 accumulates various types of information for each player who plays a game. Furthermore, the server 100 executes, mainly on the basis of operations input from each of the player terminals 1, processes for updating the accumulated information, downloading images and various types of information to the player terminal 1, etc.

The communication base stations 200*a* are connected to the communication network 200, and transmit information to and receive information from the player terminals 1 wirelessly. The communication network 200 is configured of a mobile phone network, the Internet, a local area network (LAN), a dedicated line, etc., and realizes wired or wireless communicative connection between the player terminals 1 and the server 100.

(Hardware Configurations of Player Terminal 1 and Server 100)

Figure 2A:
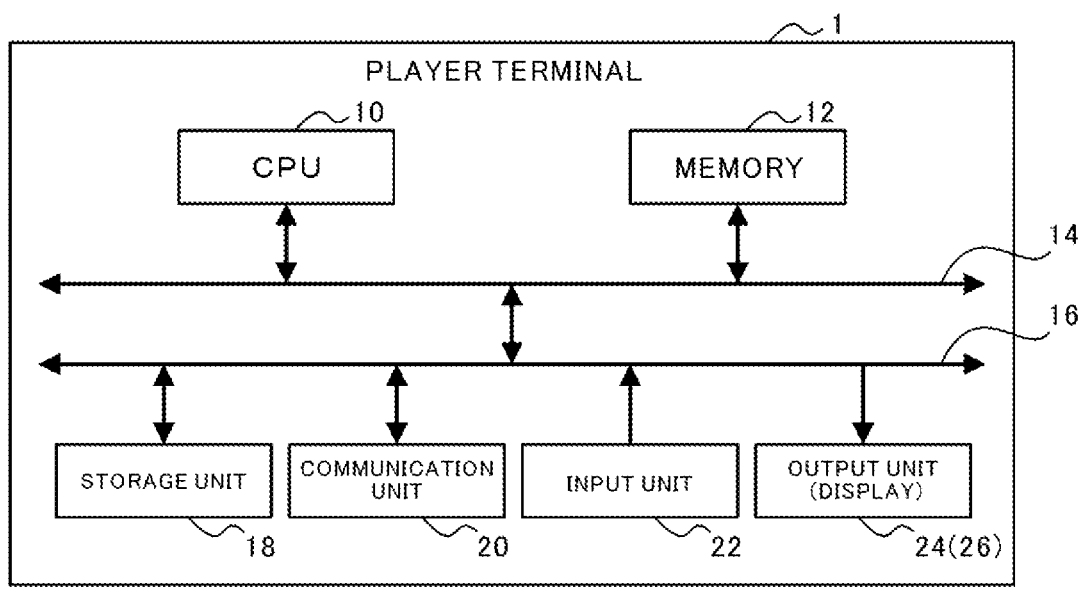
FIG. 2A is a drawing for illustrating the hardware configuration of a player terminal.
Figure 2B:
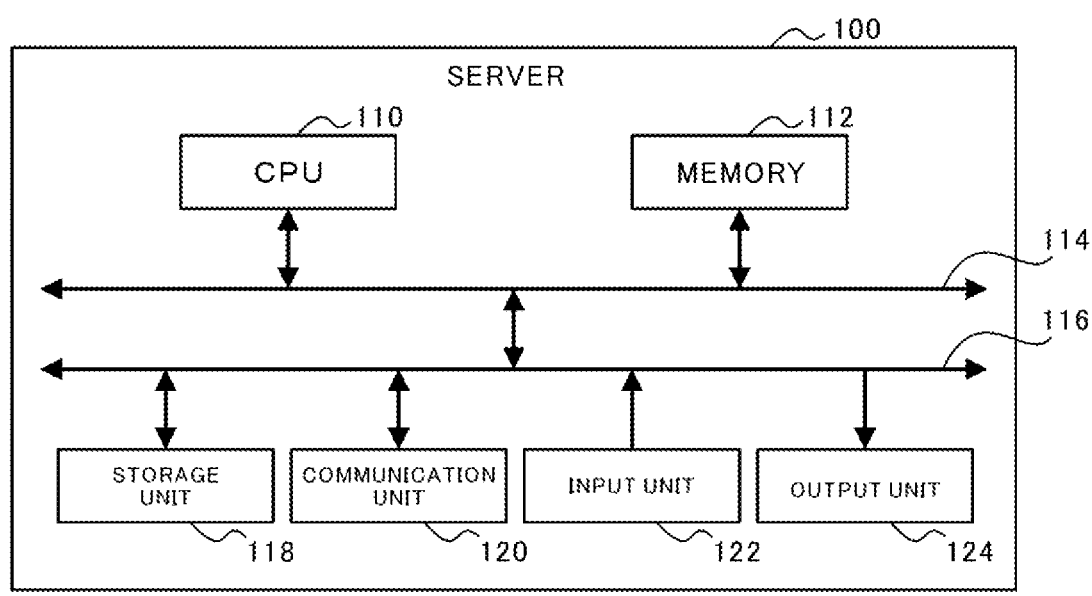
FIG. 2B is a drawing for illustrating the hardware configuration of a server.

FIG. 2A is a drawing for illustrating the hardware configuration of a player terminal 1. In addition, FIG. 2B is a drawing for illustrating the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

The configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24, respectively, of the player terminal 1. Thus, a description of the hardware configuration of the player terminal 1 will be given below, and a description of the hardware configuration of the server 100 will be omitted.

The CPU 10 runs programs stored in the memory 12 to control the proceeding of the game. The memory 12 is configured of a read only memory (ROM) or a random access memory (RAM), and stores programs and various types of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various types of programs and data. At the player terminal 1, the programs and data stored in the storage unit 18 are loaded into the memory 12 (RAM) by the CPU 10.

The communication unit 20 is communicatively connected to the communication base stations 200a wirelessly, and transmits information to and receives information from the server 100 via the communication network 200, i.e., information including various types of data and programs. At the player terminal 1, the programs, etc. received from the server 100 are stored in the memory 12 or the storage unit 18.

The input unit 22 is configured of, for example, a touchscreen, buttons, a keyboard, a mouse, arrow keys, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting and movement of the player terminal 1 or a microphone that detects speech of the player. That is, the input unit 22 may widely include devices that enable the player to input his/her intents in distinguishable manners.

The output unit 24 is configured to include a display device and a speaker. The output unit 24 may be a device connected (externally attached) to the player terminal 1. In this embodiment, the player terminal 1 is provided with a display 26 as the output unit 24 and is provided with a touchscreen as the input unit 22, wherein the touchscreen is laid over the display 26.

(Game Content)

Next, a lottery game provided by the information processing system S (game device G) according to this embodiment will be described. The lottery game according to this embodiment can be applied to any game field, including an action game, a battle game, a role playing game (RPG), a card game, and a shooting game, and specific game content is not particularly limited.

In the lottery game, at least two objects are set as target objects that can be won in a lottery process, and one of the plurality of target objects is awarded to a player by consuming in-game currency. The target objects are characters, items, etc. that can be possessed by the player, and the target objects awarded to the player are stored in association with player information. In other words, the player can earn characters, items, etc. through the lottery game in exchange for in-game currency. The characters and items earned in the lottery game can be used during the game. Here, a lottery game in which items (target items) are set as the target objects will be described.

In addition, events are held irregularly for the game according to this embodiment, and the player can play a limited edition of the game during an event holding period. In addition, the player can earn event-specific currency by playing the limited edition of the game. The player can execute an event-specific lottery game by consuming the event-specific currency as in-game currency.

Here, there are four event-specific lottery games: a first lottery game, a second lottery game, a third lottery game, and a fourth lottery game. These four lottery games are a so-called "box gacha" in which the type and number of target items that are awarded to players are preset.

In the box gacha, a lottery process for determining one of the target items in a virtual box to be a won item is executed. The won item determined in the lottery process is then removed from the box and awarded to the player. This means that each time the lottery process is executed, the number of target items in the box, i.e., the population of the lottery, is reduced. Therefore, the player can earn all of the target items in the box by executing the same number of lottery processes as the preset number of target items.

Here, the event holding period is divided into, for example, a first half and a second half. In the first half of the event holding period, the first lottery game and the second lottery game can be executed, and in the second half of the event holding period, the third lottery game and the fourth lottery game can be executed in addition to the first lottery game and the second lottery game. However, release conditions are set in each of the second lottery game, third lottery game, and fourth lottery game. The player cannot execute a lottery game that does not meet the release conditions, and can execute only the lottery games that meet the release conditions.

Here, earning a specific target item in the (n−1)-th lottery game (n is an integer equal to or larger than 2) is set as a release condition for the n-th lottery game. Therefore, for example, in order to execute the second lottery game, it is necessary to earn a specific target item in the first lottery game.

The target items set for each of the lottery games are broadly classified into a big jackpot item, a small jackpot item, and a general item. The number of target items varies for each lottery game. For example, one big jackpot item and three small jackpot items are set for each of the first, second, and third lottery games. Also, for example, four big jackpot items and four small jackpot items are set for the fourth lottery game.

In this embodiment, a big jackpot item is set as a specific target item that constitutes a release condition for the next lottery game. Therefore, the player needs to earn a big jackpot item in a lottery game in order to be able to execute the next lottery game. It should be noted, however, that even if the player earns a big jackpot item in the second lottery game, the player cannot execute the third lottery game in the first half of the event holding period. Therefore, it can be said that the release conditions for the third and fourth lottery games also include date and time information.

Here, earning a big jackpot item in a lottery game is set as a release condition for the next lottery game, but the release conditions are not limited to this. It is also acceptable that the release conditions necessary for the player to execute the next lottery game are met, for example, when all the target items are earned, when all the big jackpot items and small jackpot items are earned, or when a predetermined number of target items are earned. Thus, the release conditions need only be set in advance, and the content thereof is not particularly limited. Also, all lottery games may be executable at all times without requiring any release conditions.

Although event-specific lottery games are described here, the lottery games described below may be executable not only during the event holding period but also on a regular basis.

Figure 3A:
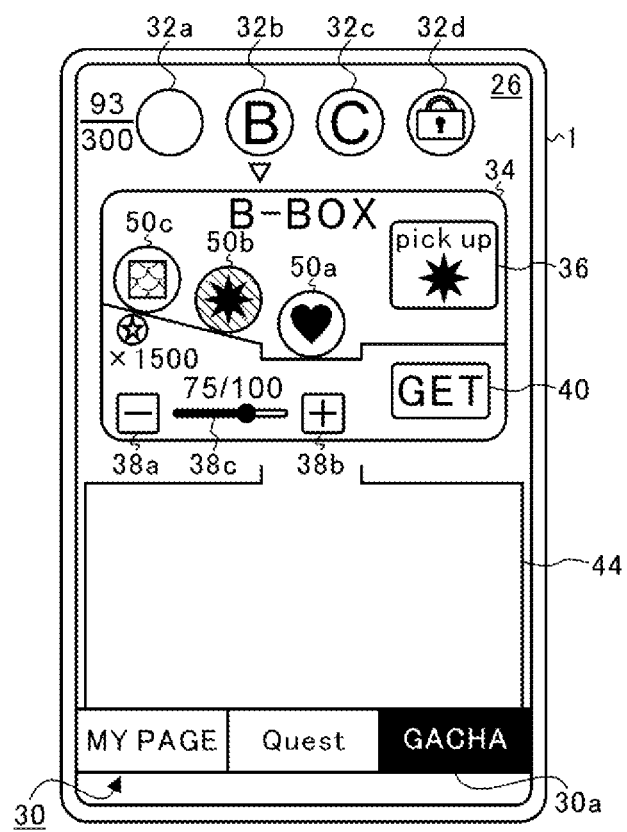
FIG. 3A is a drawing for illustrating an example of a top screen of lottery games.
Figure 3B:
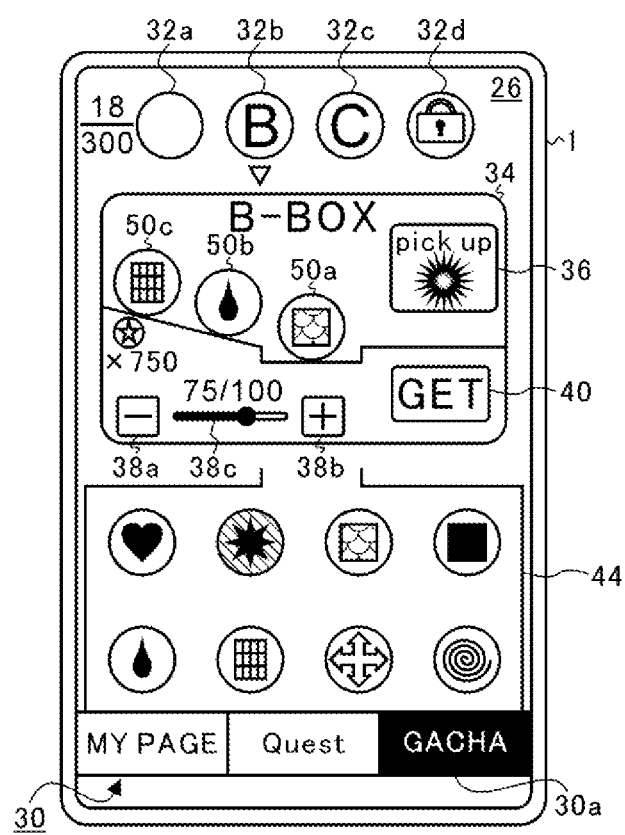
FIG. 3B is a drawing for illustrating an example of a lottery result screen.

FIG. 3A is a drawing for illustrating an example of a top screen of lottery games, and FIG. 3B is a drawing for illustrating an example of a lottery result screen. During the game, a menu bar 30 is displayed at the lower part of the display 26. The menu bar 30 is provided with a plurality of selection sections, including a lottery game selection section 30a. On the touchscreen, a tap region is set so as to overlap each of the selection sections, and when the tap region is tapped, the screen of the display 26 switches to the screen corresponding to the tapped selection section.

When the lottery game selection section 30a is tapped, the top screen of lottery games is displayed, as shown in FIG. 3A. On the top screen, the aforementioned four lottery games described above are displayed in an identifiable manner. More specifically, at the upper part of the display 26, a first box icon 32a, a second box icon 32b, a third box icon 32c, and a fourth box icon 32d are displayed. The first box icon 32a, the second box icon 32b, the third box icon 32c, and the fourth box icon 32d correspond to the first lottery game, the second lottery game, the third lottery game, and the fourth lottery game, respectively. In the following description, the first box icon 32a, the second box icon 32b, the third box icon 32c and the fourth box icon 32d are collectively referred to as box icons 32.

Each of the box icons 32 is provided with three display modes: a lottery-enabled mode, an empty mode, and a locked mode.

The lottery-enabled mode is a display mode indicating that the corresponding lottery game can be executed. When a box icon 32 displayed in the lottery-enabled mode is tapped, a setting information interface 34 for the corresponding lottery game is displayed. FIG. 3A shows that: the second box icon 32b and the third box icon 32c are displayed in the lottery-enabled mode; and the second box icon 32b is in a tapped state, i.e., the second lottery game is under selection.

At the player terminal 1, one of the executable lottery games is stored as a lottery game currently under selection. When the screen transitions to the top screen of the lottery games as a result of the lottery game selection section 30a being tapped, the setting information interface 34 corresponding to the lottery game currently under selection is displayed on the display 26.

The empty mode is a display mode indicating that all the target items have already been earned in the corresponding lottery game, in other words, the contents of the box are empty. In FIG. 3A, the first box icon 32a is displayed in the empty mode. Here, it is assumed that a box icon 32 in the empty mode does not accept any operation. However, when a box icon 32 in the empty mode is tapped, the target items, etc. that have been earned may be displayed.

The locked mode is a display mode indicating that the release conditions for the corresponding lottery game have not been met and the relevant lottery game cannot be executed. In FIG. 3A, the fourth box icon 32d is displayed in the locked mode. Here, it is assumed that when a box icon 32 in the locked mode is tapped, detailed information concerning the corresponding lottery game is displayed. It should be noted, however, that a box icon 32 in the locked mode may be configured not to accept any operation.

As shown in FIG. 3A, the setting information interface 34 includes a pickup tab 36, a minus tab 38a, a plus tab 38b, an operation bar 38c, and an execution tab 40. The pickup tab 36 reports an unearned eye-catching item (here, big jackpot item or small jackpot item) among the target items set for the lottery game currently under selection.

For example, if no big jackpot items have yet been earned in the lottery game currently under selection, a big jackpot item is displayed on the pickup tab 36, and if a big jackpot item has already been earned, one of the unearned small jackpot items is displayed. Note that if all big jackpot items and small jackpot items have been earned, the pickup tab 36 may be hidden or may indicate that all eye-catching items have been earned.

In addition, on the top screen of the lottery games, stock count information for the lottery game currently under selection is displayed in the upper left corner of the display 26. The stock count information is displayed in the form of a fraction, such that the denominator indicates the number of target items set for the lottery game currently under selection and the numerator indicates the number of unearned target items. In FIG. 3A, it is reported that the number of target items for the second lottery game is 300 and the number of unearned target items is 93.

Here, the pickup tab 36 and the display section for the stock count information function as operating sections for accepting a stock confirmation operation. When a stock confirmation operation is input as a result of the pickup tab 36 and the display section for the stock count information being tapped, a stock confirmation screen is displayed.

Figure 4:
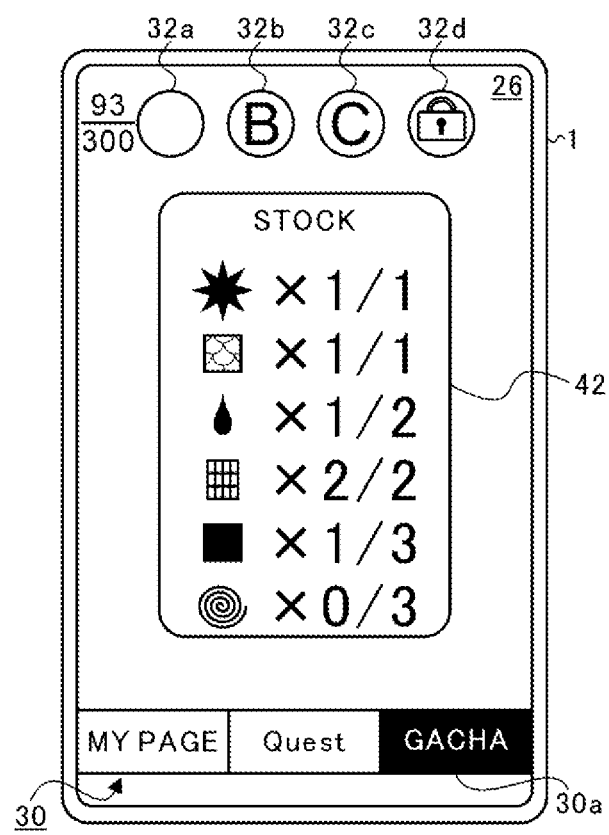
FIG. 4 is a drawing for illustrating an example of a stock confirmation screen.

FIG. 4 is a drawing for illustrating an example of the stock confirmation screen. As shown in FIG. 4, on the stock confirmation screen, a stock information interface 42 is displayed. In the stock information interface 42, the target items of the lottery game currently under selection are displayed. Here, each type of target item is accompanied by a denominator indicating the initially set number of items and a numerator indicating the number of unearned items, i.e., the number of items remaining in the box. Because this stock information interface 42 is generated for each of the lottery games, the player can grasp the initially set target items and the unearned target items for each of the lottery games.

Referring back to FIG. 3A, the minus tab 38a, the plus tab 38b, and the operation bar 38c function as operating sections for setting the number of times the lottery game currently under selection is executed. In this embodiment, the number of times the lottery game currently under selection is executed can be set within the range of 1 to 100 in the setting information interface 34. During the display of the setting information interface 34, the number of executions is retained in the player terminal 1. When the minus tab 38a is tapped, the number of executions is reduced by one, and when the plus tab 38b is tapped, the number of executions is increased by one. In addition, when the operation bar 38c is subjected to a slide operation in the left/right directions, the number of executions changes according to the slide position.

The execution tab 40 functions as an operating section for receiving an execution operation on the lottery game currently under selection. More specifically, when an execution operation is input as a result of the execution tab 40 being tapped, execution information is transmitted to the server 100. This execution information is generated in such a manner that the lottery game currently under selection and the number of executions retained in the player terminal 1 can be identified.

Although described in detail below, upon receiving the execution information, the server 100 determines, among the target items, an earned item that is awarded to the player. The player terminal 1 receives lottery result information indicating the earned item determined by the server 100, and displays the earned item in an earned item display region 44, as shown in FIG. 3B. In addition, the setting information interface 34 is updated so as to reflect the information after the earned item has been awarded.

Although detailed explanations will be omitted, when a big jackpot item or a small jackpot item is earned, a predetermined presentation is executed. In addition, in the earned item display region 44, items are displayed differently depending on the rarity values (degrees of rarity) thereof, such as a big jackpot item being displayed in rainbow color, a small jackpot item being displayed in gold color, etc. Furthermore, the background of the setting information interface 34 is displayed in gradation, and the number of remaining items can be visually recognized by the color and range of the gradation.

FIG. 5A is a drawing for illustrating an example of master data for the first lottery game. FIG. 5B is a drawing for illustrating an example of master data for the second lottery game. During the event holding period, the master data provided for each of the lottery games is retained in the storage unit 118 of the server 100. FIGS. 5A and 5B show the master data for the first lottery game and the master data for the second lottery game, respectively, but apart from these, the storage unit 118 of the server 100 also retains the master data for the third lottery game and the fourth lottery game.

As shown in FIGS. 5A and 5B, the master data for each of the lottery games stores the types of target items set for that lottery game and the initially set number of items. In addition, when the player terminal 1 logs in for the first time during the event holding period, it receives the master data for all lottery games from the server 100 and stores them in the storage unit 18. Therefore, the master data for the lottery games are stored in both the player terminal 1 and the server 100.

The master data for the lottery games stored in the storage unit 118 of the server 100 is used to generate a lottery table (lottery odds) used in the lottery process described below. On the other hand, the master data for the lottery games stored in the storage unit 18 of the player terminal 1 is used to display various types of information related to the lottery games, such as information displayed in the setting information interface 34 described above.

FIG. 6A is a drawing for illustrating an example of earning data for the first lottery game. FIG. 6B is a drawing for illustrating an example of earning data for the second lottery game. During the event holding period, the earning data provided for each of the lottery games is retained for each player in the storage unit 118 of the server 100. FIGS. 6A and 6B show the earning data for the first lottery game and the earning data for the second lottery game, respectively, but apart from these, the storage unit 118 of the server 100 also retains the earning data for the third lottery game and the fourth lottery game.

As shown in FIGS. 6A and 6B, the earning data for each of the lottery games stores the number of earned items, or in other words, the number of items awarded to the player, for each type of the target items set for the relevant lottery game. In the server 100, when a lottery game is executed and a target item is awarded to the player, the number of earned target items of the type corresponding to the type of the awarded target item is updated. In other words, in the server 100, each time a lottery game is executed, the earning data is updated. When a lottery game is executed, the player terminal 1 receives the earning data from the server 100 and stores it in the storage unit 18.

When an execution operation is input as a result of the execution tab 40 being tapped and the execution information is transmitted to the server 100, the server 100 generates a lottery table (lottery odds) used in the lottery process. In the server 100, the master data and earning data for the lottery game corresponding to the execution information are read from the storage unit 118 into the memory 112. The server 100 then derives the number of remaining items for each type of the target items by subtracting the number of earned items stored in the earning data from the initially set number of items stored in the master data, thus generating a lottery table in the memory 112. In addition, in the player terminal 1, the display of the stock information interface 42 and the setting information interface 34 is controlled on the basis of the earning data received from the server 100.

Here, as shown in FIG. 3A, a first suggestion image 50a, a second suggestion image 50b, and a third suggestion image 50c are displayed in the setting information interface 34. The first suggestion image 50a, the second suggestion image 50b, and the third suggestion image 50c each suggest a winning-scheduled item (winning-scheduled object). Here, the winning-scheduled item is a target item that is awarded to the player when the lottery game currently under selection is executed. Although described later in detail, in this embodiment, three winning-scheduled items, including a first winning-scheduled item, a second winning-scheduled item, and a third winning-scheduled item, are predetermined for each of the lottery games. For example, when the lottery game is executed once, the first winning-scheduled item is always awarded to the player as an earned item.

When the first winning-scheduled item is awarded to the player, the second and third winning-scheduled items become the first and second winning-scheduled items, respectively, and a new third winning-scheduled item is added. Thus, in this embodiment, the target items that are awarded to the player when a lottery game is executed are predetermined to be winning-scheduled items.

A first suggestion image 50a, a second suggestion image 50b, and a third suggestion image 50c suggest the first winning-scheduled item, the second winning-scheduled item, and the third winning-scheduled item, respectively. In other words, the first suggestion image 50a, the second suggestion image 50b, and the third suggestion image 50c allow the player to know in advance the target items that can be earned in the subsequent three lottery games without consuming in-game currency.

In this manner, by informing the player of winning-scheduled items in advance, the fun of the lottery game can be enhanced, and the player can be motivated to execute the lottery game. Also, in this embodiment, multiple types of lottery games can be executed in the same period, and the player can select and execute one of the multiple types of lottery games. In this case, winning-scheduled items for each of the lottery games are reported, which brings about a decision-making tool for determining which lottery game to execute or in what order to execute the lottery games.

In addition, when the execution period of the lottery game is limited, as in this embodiment, the notification of winning-scheduled items near the end of the execution period is particularly useful as a decision-making tool for selecting a lottery game. Similarly, when the amount of in-game currency is small, the notification of winning-scheduled items can help the player determine which lottery game to play.

The functional configuration (functional units) of the information processing system S for executing the above-described lottery games, as well as the processing executed by each of the functional units, will be described below.

(Functional Configuration of Information Processing System S)

Figure 7:
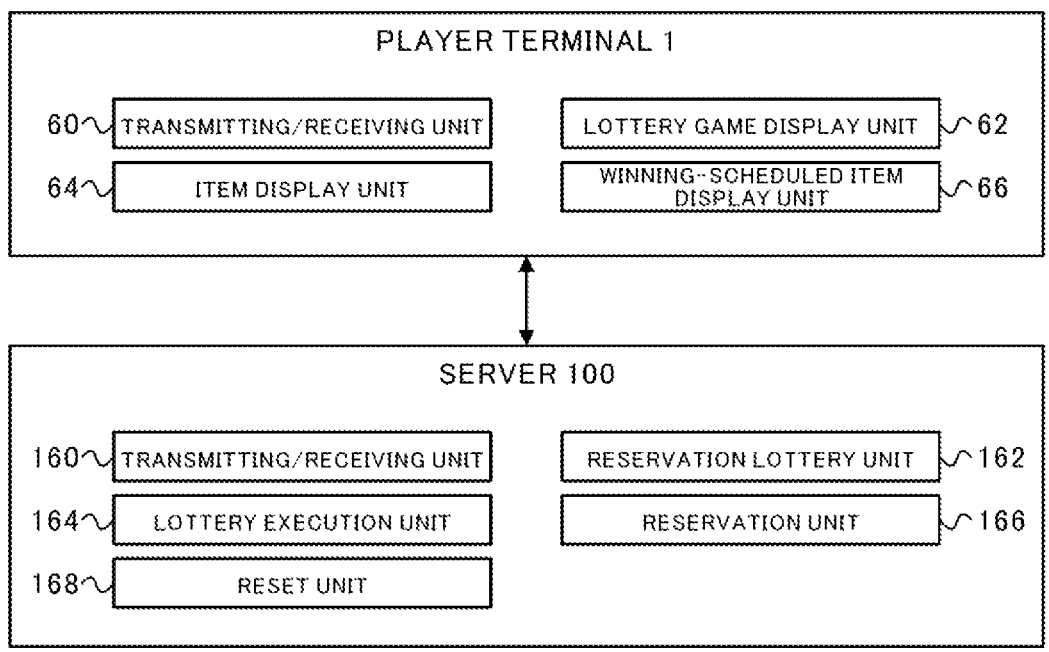
FIG. 7 is a drawing for illustrating functional configurations of the player terminal and the server.

FIG. 7 is a drawing for illustrating the functional configurations of the player terminal 1 and the server 100. The memory 12 of the player terminal 1 stores the programs for proceeding with the game. The CPU 10 of the player terminal 1 executes the programs, thereby causing the player terminal 1 to function as a transmitting/receiving unit 60, a lottery game display unit 62, an item display unit 64 (target object display unit), and a winning-scheduled item display unit 66 (suggestion unit).

Also, the CPU 110 of the server 100 executes the programs, thereby causing the server 100 to function as a transmitting/receiving unit 160, a reservation lottery unit 162 (object determination unit), a lottery execution unit 164 (object determination unit), a reservation unit 166, and a reset unit 168.

Note that the functional units shown in FIG. 7 are merely examples, and many other functional units are also provided. In addition, each functional unit may be provided in either the player terminal 1 or the server 100. Also, functional units that play the same role may be provided in duplicate in the player terminal 1 and the server 100.

The transmitting/receiving unit 60 transmits various types of information from the player terminal 1 to the server 100 and also receives various types of information from the server 100.

The lottery game display unit 62 displays a plurality of types of lottery games on the display 26 so as to be selectable, as seen on the top screen of the lottery games shown in FIG. 3A.

The item display unit 64 displays the target items on the display 26 for each of the lottery games, as seen in the stock information interface 42 shown in FIG. 4.

The winning-scheduled item display unit 66 displays the first suggestion image 50a, the second suggestion image 50b, and the third suggestion image 50c on the display 26 to suggest, for each of the lottery games, the winning-scheduled items reserved to be awarded to the player.

A transmitting/receiving unit 160 receives various types of information from the player terminal 1, and also sets various types of information to allow the player terminal 1 to receive the information.

The reservation lottery unit 162 executes, without consuming in-game currency, the lottery process for a lottery game in which no winning-scheduled items are stored, and determines the target item that has been won in the lottery process to be a won item.

The lottery execution unit 164, on the basis of an input of the execution operation for selecting and executing one of the lottery games, determines at least a winning-scheduled item to be an earned item that is awarded to the player by consuming a predetermined amount of in-game currency. More specifically, the lottery execution unit 164 executes a lottery process on the basis of an input of the execution operation, determines the target item that has been won in the lottery process to be a won item, and determines the winning-scheduled item stored before the lottery process is executed to be an earned item that is awarded to the player. In this case, the lottery execution unit 164 determines, in the lottery process, the won item from among the target items, excluding the winning-scheduled items, that have not been awarded to the player. In addition, the lottery execution unit 164 determines the winning-scheduled items to be earned items that will be awarded to the player in order starting from the winning-scheduled item that was won first.

The reservation unit 166 stores one of the target items for each of the lottery games as a winning-scheduled item that is reserved to be awarded to the player. More specifically, the reservation unit 166 stores, as a winning-scheduled item, the won item determined in the lottery process. At this time, the reservation unit 166 stores a plurality of winning-scheduled items in association with the winning orders in the lottery process.

The reset unit 168 resets the earning data on the basis of the player's input of a reset operation.

Next, an example of processing in the information processing system S will be described. Among the processes in the player terminal 1 and the server 100, the processes related to the lottery game will be described below, and descriptions of the other processes will be omitted. The division of roles for processing in the player terminal 1 and the server 100 described below is merely an example. Thus, for example, processing in the player terminal 1 described below may be executed in the server 100, and processing in the server 100 may be executed in the player terminal 1.

(Processing in Information Processing System S)

Figure 8:
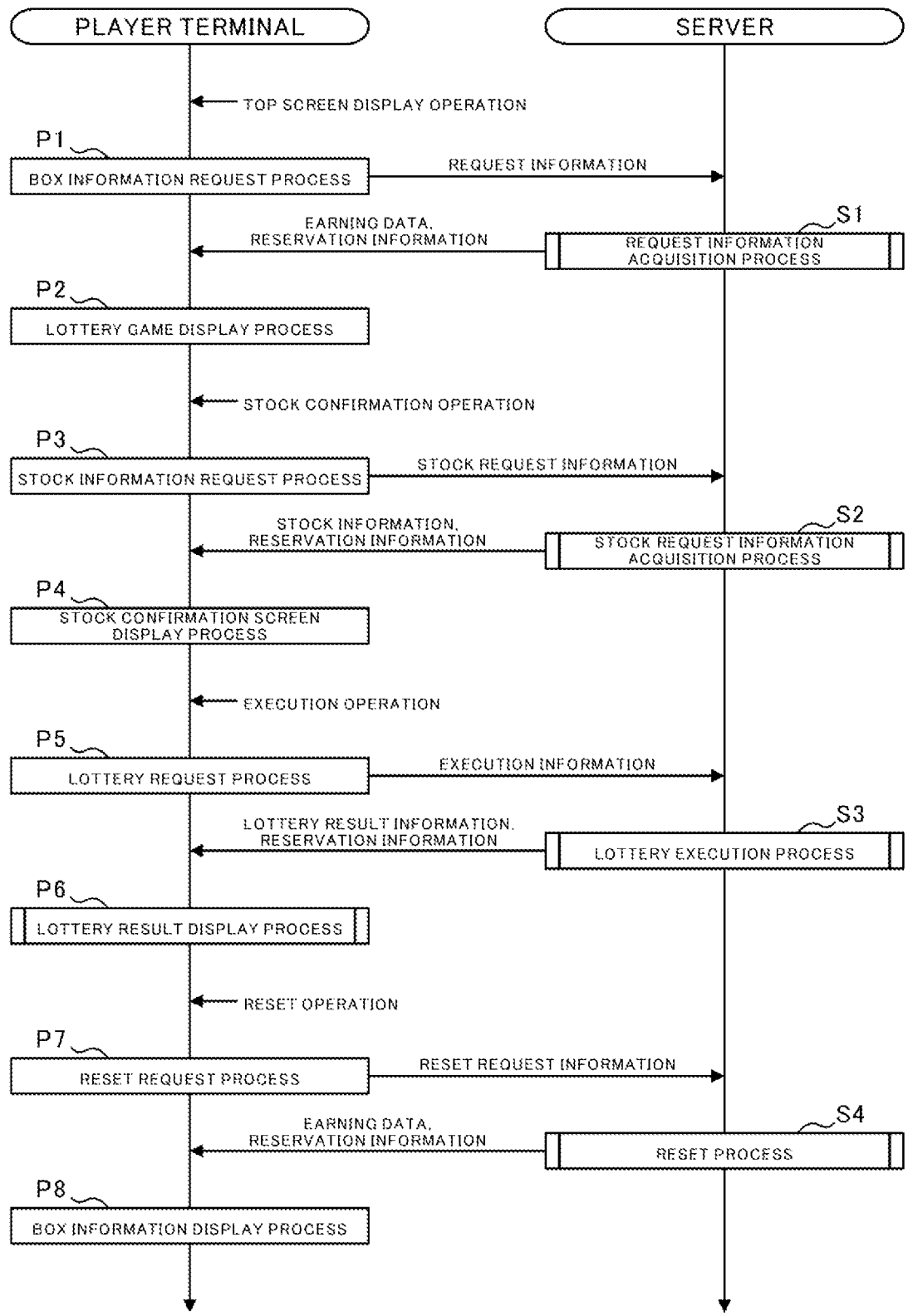
FIG. 8 is a sequence diagram for illustrating processing related to a lottery game in the player terminal and the server.

FIG. 8 is a sequence diagram for illustrating processing related to a lottery game in the player terminal 1 and the server 100. When a top screen display operation is input as a result of the lottery game selection section 30a being tapped, a box information request process for causing the transmitting/receiving unit 60 to transmit request information to the server 100 is executed (P1). When the transmitting/receiving unit 160 of the server 100 receives the request information, a request information acquisition process for setting the earning data and reservation information stored in association with the player ID is executed (S1).

Figure 9:
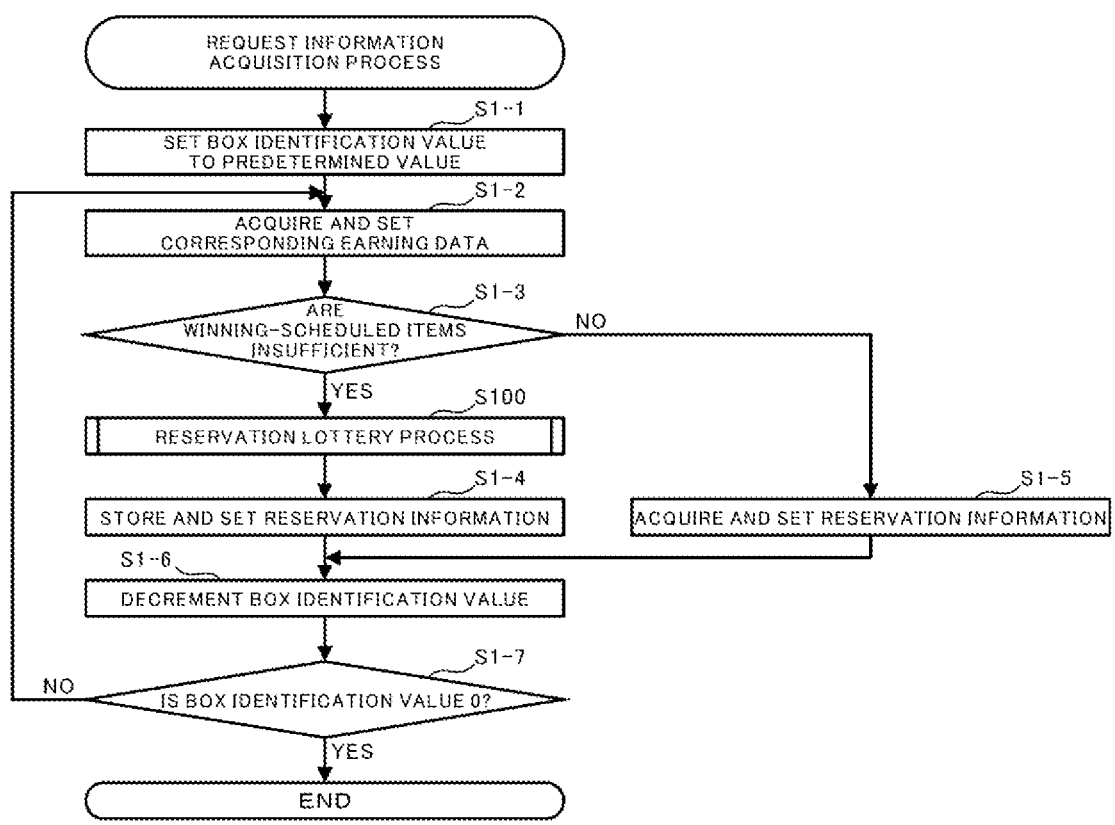
FIG. 9 is a flowchart for illustrating a request information acquisition process in the server.

FIG. 9 is a flowchart for illustrating the request information acquisition process in the server 100. When the server 100 receives the request information, the transmitting/receiving unit 160 sets a box identification value to a predetermined value (S1-1). Here, the box identification value is information that identifies the type of the lottery game, and is a value from 0 to 3. Box identification value=0 indicates the first lottery game, box identification value=1 indicates the second lottery game, box identification value=2 indicates the third lottery game, and the box identification value=3 indicates the fourth lottery game. Here, the box identification value is set to 3 as the predetermined value.

The transmitting/receiving unit 160 acquires, from the storage unit 118, the earning data corresponding to the set box identification value and sets (transmits) the acquired earning data (S1-2). This allows the earning data to be received by the player terminal 1.

Next, the transmitting/receiving unit 160 determines whether or not there is a shortage in the winning-scheduled items for the lottery game corresponding to the box identification value (S1-3). As described above, normally three winning-scheduled items need to be stored, but if the number of target items remaining in the box is less than or equal to two, the number of winning-scheduled items needs to be equal to the number of target items remaining in the box. Here, in the case where the number of target items remaining in the box is 3 or more, it is determined that the number of winning-scheduled items is insufficient if the number of winning-scheduled items is not 3. In addition, in the case where the number of target items remaining in the box is 2 or less, it is determined that the number of winning-scheduled item is insufficient if the number of winning-scheduled items is less than the number of remaining target items.

If the number of winning-scheduled items is insufficient (YES in S1-3), the reservation lottery unit 162 executes a reservation lottery process (S100).

Figure 10:
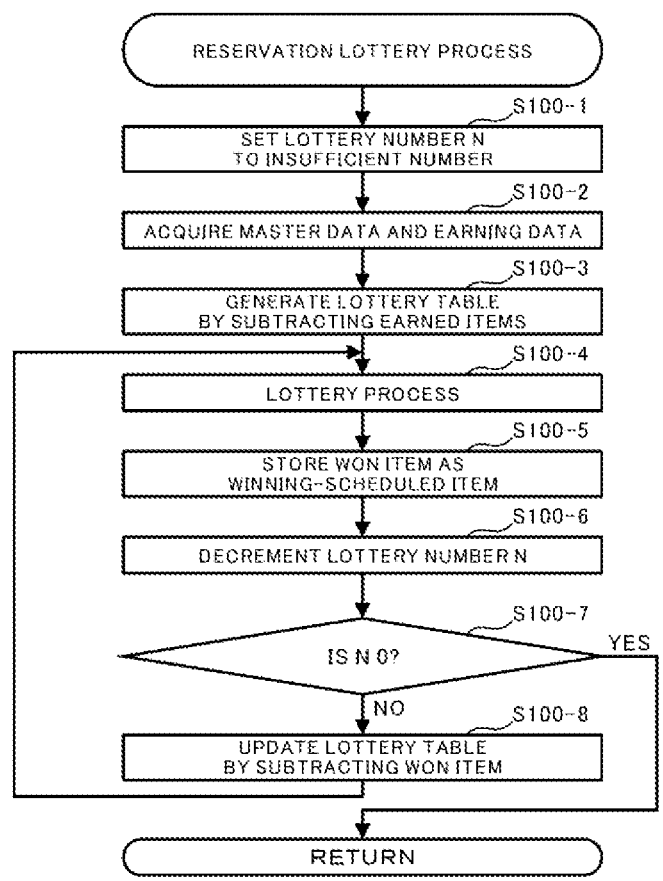
FIG. 10 is a flowchart for illustrating a reservation lottery process in the server.

FIG. 10 is a flowchart for illustrating the reservation lottery process in the server 100. The reservation lottery unit 162 sets the number of insufficient winning-scheduled items as a lottery number N in a lottery number counter (S100-1). The purpose of this reservation lottery process is to determine three winning-scheduled items for a player from whom the request information has been received for the first time during the event holding period. Therefore, the lottery number counter is usually set to 3, which is the number of insufficient items, as the lottery number N.

Next, the reservation lottery unit 162 acquires, from the storage unit 118, the master data and earning data corresponding to the box identification value, and stores them in the memory 112 (S100-2). Next, the reservation lottery unit 162 generates, in the memory 112, a lottery table by subtracting the number of earned items from the initially set number of items on the basis of the master data and the earning data (S100-3).

By using the lottery table generated in S100-3 or updated in S100-8 described below, the reservation lottery unit 162 executes the lottery process for determining, by lottery, any one of the target items in the box to be a won item (S100-4). Next, the reservation lottery unit 162 stores, in the memory 112 as a winning-scheduled item, the won item determined in the lottery process (S100-5). Here, the winning-scheduled item is stored with a winning order attached thereto.

Next, the reservation lottery unit 162 decrements the lottery number N of the lottery number counter (S100-6) and determines whether or not the updated lottery number N is 0 (S100-7). If the lottery number N is 0 (YES in S100-7), the reservation lottery process ends. If the lottery number N is not 0 (NO in S100-7), the lottery table is updated by subtracting the won item from the lottery table (S100-8), and processing is repeated from S100-4. The above-described reservation lottery process stores the same number of winning-scheduled items as the number of insufficient items.

Referring back to FIG. 9, the transmitting/receiving unit 160 stores, in the storage unit 118, reservation information indicating the winning-scheduled items determined and stored in the reservation lottery process (S100), and sets the reservation information so as to be receivable by the player terminal 1 (S1-4). In addition, if the number of winning-scheduled items is not insufficient (NO in S1-3), the transmitting/receiving unit 160 acquires reservation information from the storage unit 118 and sets that reservation information so as to be receivable by the player terminal 1 (S1-5).

Next, the transmitting/receiving unit 160 decrements the box identification value (S1-6) and determines whether or not the updated box identification value is 0 (S1-7). If the box identification value is 0 (YES in S1-7), the request information acquisition process ends. If the box identification value is not 0 (NO in S1-7), processing is repeated from S1-2.

According to the above request information acquisition process, the earning data and reservation information are set for all lottery games. If the number of winning-scheduled items is insufficient when the request information is received, the reservation lottery process (S100) is executed, and the same number of winning-scheduled items as the insufficient number are determined and stored.

Referring back to FIG. 8, when the transmitting/receiving unit 60 of the player terminal 1 receives the earning data and reservation information from the server 100, the lottery game display unit 62 executes a lottery game display process (P2). Here, on the basis of the received earning data and reservation information, the lottery game display unit 62 displays the top screen of the lottery games on the display 26.

At the player terminal 1, when a stock confirmation operation is input as a result of either the pickup tab 36 or the display section for the stock count information displayed on the top screen of the lottery games being tapped, a stock information request process for causing the transmitting/receiving unit 60 to transmit stock request information to the server 100 is executed (P3). When the transmitting/receiving unit 160 of the server 100 receives the stock request information, the stock request information acquisition process for setting the earning data and reservation information stored in association with the player ID is executed (S2).

Figure 11:
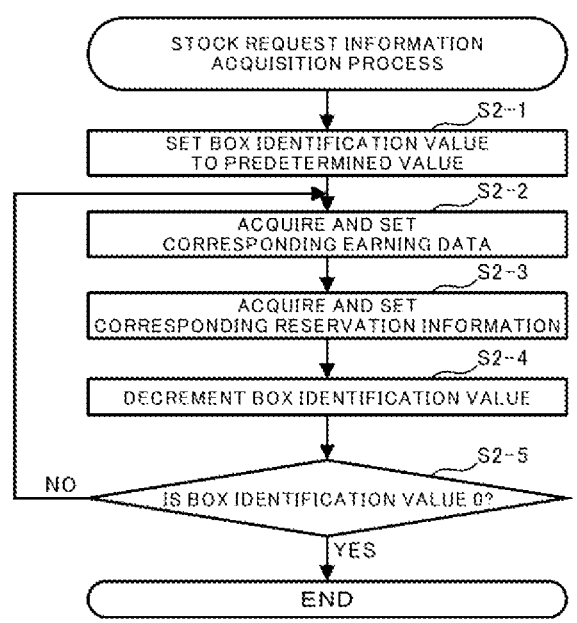
FIG. 11 is a flowchart for illustrating a stock request information acquisition process in the server.

FIG. 11 is a flowchart for illustrating the stock request information acquisition process in the server 100. When the server 100 receives the stock request information, the transmitting/receiving unit 160 sets the box identification value to a predetermined value (S2-1). Next, the transmitting/receiving unit 160 acquires, from the storage unit 118, the earning data corresponding to the set box identification value and sets the earning data so as to be receivable by the player terminal 1 (S2-2). This allows the earning data to be received by the player terminal 1.

Next, the transmitting/receiving unit 160 acquires, from the storage unit 118, the reservation information corresponding to the set box identification value and sets the reservation information so as to be receivable by the player terminal 1 (S2-3). This allows the reservation information to be received by the player terminal 1. Next, the transmitting/receiving unit 160 decrements the box identification value (S2-4) and determines whether or not the updated box identification value is 0 (S2-5). If the box identification value is 0 (YES in S2-5), the stock request information acquisition process ends. If the box identification value is not 0 (NO in S2-5), processing is repeated from S2-2.

Referring back to FIG. 8, when the transmitting/receiving unit 60 of the player terminal 1 receives the earning data and the reservation information from the server 100, the item display unit 64 executes a stock confirmation screen display process (P4). Here, on the basis of the master data stored in advance and the received earning data, the item display unit 64 derives, for each type of the target items, the number of remaining items by subtracting the number of earned items stored in the earning data from the initially set number of items stored in the master data, and displays the stock confirmation screen (stock information interface 42). Also, the item display unit 64 updates and displays the setting information interface 34 on the basis of the received reservation information.

In addition, at the player terminal 1, when an execution operation is input as a result of the execution tab 40 displayed on the top screen of the lottery games being tapped, a lottery request process for causing the transmitting/receiving unit 60 to transmit the execution information to the server 100 is executed (P5). When the transmitting/receiving unit 160 of the server 100 receives the execution information, the lottery execution unit 164 executes a lottery execution process (S3).

Figure 12:
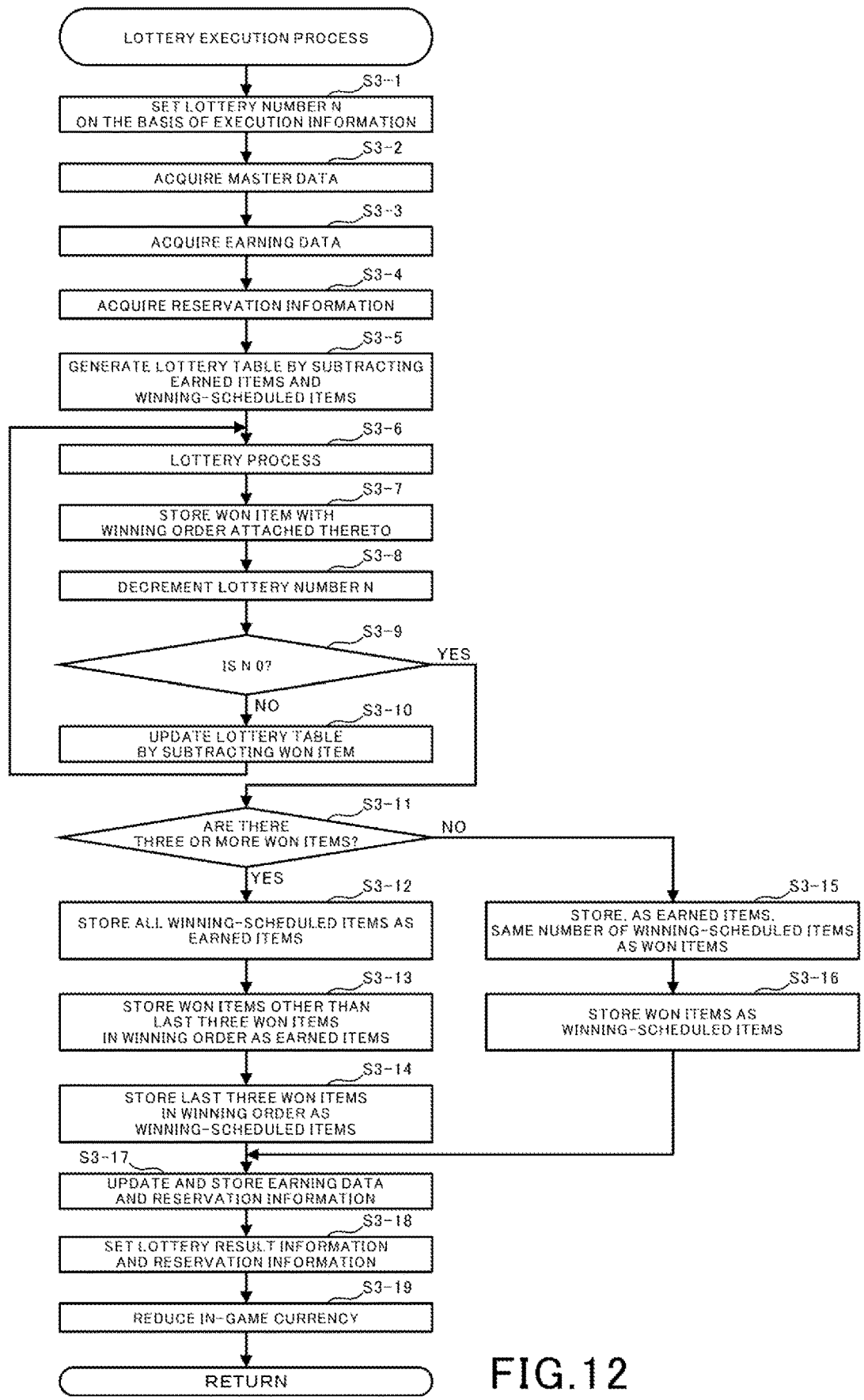
FIG. 12 is a flowchart for illustrating a lottery execution process in the server.

FIG. 12 is a flowchart for illustrating the lottery execution process in the server 100. When the server 100 receives the execution information, the lottery execution unit 164 sets the lottery number N in the lottery number counter on the basis of the execution information (S3-1). Note that the execution information transmitted from the player terminal 1 is configured to be capable of identifying the number of executions, and here, the same lottery number N as the number of executions selected in the player terminal 1 is set.

Next, on the basis of the received execution information, the lottery execution unit 164 acquires, from the storage unit 118, the master data for the lottery game selected by the player (S3-2). Also, on the basis of the received execution information, the lottery execution unit 164 acquires, from the storage unit 118, the earning data for the lottery game selected by the player (S3-3). Also, on the basis of the received execution information, the lottery execution unit 164 acquires, from the storage unit 118, the reservation information corresponding to the lottery game selected by the player (S3-4).

Next, on the basis of the master data, earning data, and reservation information, the lottery execution unit 164 generates a lottery table in the memory 112 (S3-5). Here, the lottery table is generated by subtracting the number of earned items from the initially set number of items and further subtracting, from the remaining target items, the winning-scheduled items.

By using the lottery table generated in S3-5 or updated in S3-10 described below, the lottery execution unit 164 executes the lottery process for determining, by lottery, any one of the target items in the box to be a won item (S3-6). Next, the lottery execution unit 164 stores, in the memory 112, the won item determined in the lottery process with a winning order attached thereto (S3-7).

Next, the lottery execution unit 164 decrements the lottery number N in the lottery number counter (S3-8) and determines whether or not the updated lottery number N is 0 (S3-9). If the lottery number N is not 0 (NO in S3-9), the lottery table is updated by subtracting the won item from the lottery table (S3-10), and processing is repeated from S3-6.

In addition, if the lottery number N is 0 (YES in S3-9), the lottery execution unit 164 determines whether or not three or more won items are stored (S3-11). If three or more won items are stored (YES in S3-11), all the winning-scheduled items stored before the execution of the above-described lottery process (S3-6) are stored in the memory 112 as earned items (S3-12).

Next, among the won items stored in the memory 112, the won items other than the last three won items in the winning order are stored by the lottery execution unit 164 in the memory 112 as earned items (S3-13). Next, among the won items stored in the memory 112, the last three won items in the winning order are stored by the reservation unit 166 in the memory 112 as winning-scheduled items (S3-14).

Also, if three or more won items are not stored (NO in S3-11), the winning-scheduled items stored before the execution of the above-described lottery process (S3-6) are stored by the lottery execution unit 164 in the memory 112 as earned items (S3-15). Here, the same number of winning-scheduled items as the won items stored in the memory 112 are stored as earned items. At this time, among the winning-scheduled items, the winning-scheduled items are stored as earned items in the order from the first to last won items. Next, the reservation unit 166 stores the won items stored in the memory 112 as the winning-scheduled items in the memory 112 (S3-16).

The lottery execution unit 164 updates, for the earning data, the number of earned items stored in the memory 112, updates the reservation information on the basis of the winning-scheduled items stored in the memory 112, and stores the updated earning data and reservation information in the storage unit 118. Also, here, the earned items are stored in the storage unit 118 as items possessed by the player. The lottery execution unit 164 sets the lottery result information indicating the earned items, as well as reservation information, stored in the memory 112 so as to be receivable by the player terminal 1 (S3-18). Also, the lottery execution unit 164 reduces the in-game currency by the number of lottery processes that have been executed (S3-19).

The above-described lottery execution process determines the same number of won items as the number of times specified by the player. In addition, the same number of earned items as the number of times specified by the player are awarded to the player. At this time, winning-scheduled items, which have been reserved to be awarded in advance, are awarded to the player with high priority, and some or all of the won items that have been won in the lottery process will be awarded to the player as new winning-scheduled items when the subsequent lottery games are executed.

Referring back to FIG. 8, when the transmitting/receiving unit 60 of the player terminal 1 receives the lottery result information and the reservation information from the server 100, the item display unit 64 executes a lottery result display process for displaying the earned items in the earned item display region 44 (P6).

Figure 13:
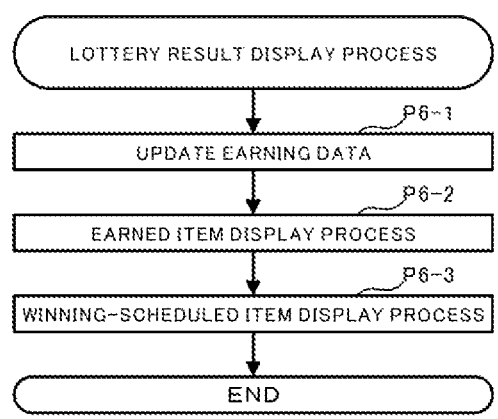
FIG. 13 is a flowchart for illustrating a lottery result display process in the player terminal.

FIG. 13 is a flowchart for illustrating the lottery result display process in the player terminal 1. The item display unit 64 updates the earning data on the basis of the received lottery result information (P6-1), and performs an earned item display process for displaying the earned items in the earned item display region 44 (P6-2). Next, on the basis of the received reservation information, the winning-scheduled item display unit 66 displays, in the setting information interface 34, the first suggestion image 50a, the second suggestion image 50b, and the third suggestion image 50c corresponding to the winning-scheduled items (P6-3).

Here, in the lottery game, a reset condition is preset in some cases. In a lottery game in which a reset condition is set, the player can input a reset operation when the reset condition is met. When a reset operation is input, the contents of the box are reset, and the player can earn target items in a reset state.

Examples of the reset condition include earning one or more predetermined target items such as big jackpot items, earning all target items in the box, and earning a predetermined number or more of target items. Note that the reset condition may be the same or different for all lottery games.

In addition, the contents of the box at the time it is reset may be the same as or different from those in the initial state. For example, when the box is reset, the contents of the box may be the same as those set in the initial state, but excluding some target items, such as big jackpot items. Alternatively, when the box is reset, the probability of winning a rare target item may be reduced by increasing the number of some target items, such as general items.

Furthermore, the contents of the box after being reset may differ depending on the number of times the box is reset. In this case, the more times the box is reset, the more advantageous or disadvantageous the contents of the box may become to the player. An example of processing when a reset operation is input is described below.

As shown in FIG. 8, when a reset operation is input in the player terminal 1, the transmitting/receiving unit 60 executes a reset request process for transmitting reset request information to the server 100 (P7). Note that the reset request information is provided for each of the lottery games. When the transmitting/receiving unit 160 of the server 100 receives the reset request information, a reset process for resetting the earning data and reservation information stored in association with the player ID is executed (S4).

Figure 14:
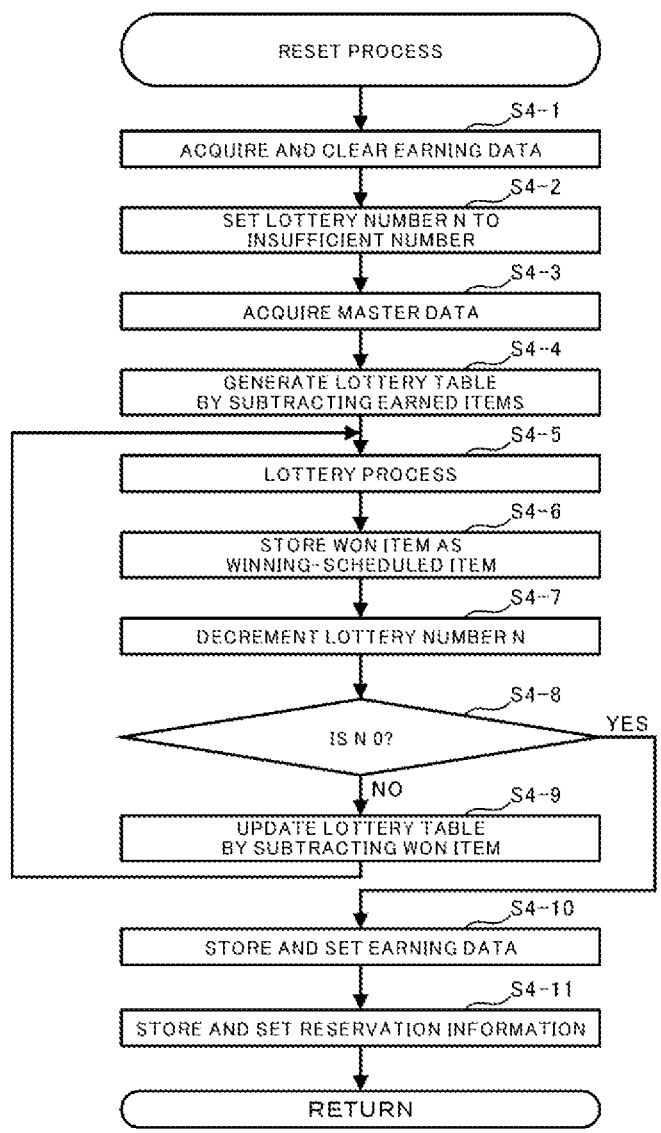
FIG. 14 is a flowchart for illustrating a reset process in the server.

FIG. 14 is a flowchart for illustrating the reset process in the server 100. The reset unit 168 acquires, from the storage unit 118, the earning data for the lottery game corresponding to the received reset request information and clears the earning data (S4-1). Next, the reservation lottery unit 162 sets the number of insufficient winning-scheduled items as the lottery number N in the lottery number counter (S4-2).

Next, the reservation lottery unit 162 acquires, from the storage unit 118, the master data corresponding to the reset request information (S4-3). Next, the reservation lottery unit 162 generates, in the memory 112, a lottery table by subtracting the number of earned items (here, the number of earned target items is 0 for all types of target items) from the initially set number of items on the basis of the master data and the earning data (S4-4).

By using the lottery table generated in S4-4 or updated in S4-9 described below, the reservation lottery unit 162 executes the lottery process for determining, by lottery, any one of the target items in the box to be a won item (S4-5). Next, the reservation lottery unit 162 stores, in the memory 112 as a winning-scheduled item, the won item determined in the lottery process (S4-6). Here, the winning-scheduled item is stored with a winning order attached thereto.

Next, the reservation lottery unit 162 decrements the lottery number N of the lottery number counter (S4-7) and determines whether or not the updated lottery number N is 0 (S4-8). If the lottery number N is not 0 (NO in S4-8), the lottery table is updated by subtracting the won item from the lottery table (S4-9), and processing is repeated from S4-5.

If the lottery number N is 0 (YES in S4-8), the reservation lottery unit 162 stores the earning data cleared in S4-1 in the storage unit 118 and sets the earning data so as to be receivable by the player terminal 1 (S4-10). In addition, the reservation lottery unit 162 stores, in the storage unit 118, the reservation information indicating the winning-scheduled item stored in the memory 112 in S4-6, and also sets the reservation information so as to be receivable by the player terminal 1 (S4-11).

Referring back to FIG. 8, when the transmitting/receiving unit 60 of the player terminal 1 receives the earning data and the reservation information from the server 100, the lottery game display unit 62 executes the lottery game display process (P8). Here, on the basis of the received earning data and reservation information, the lottery game display unit 62 displays the top screen of the lottery games on the display 26.

Although an aspect of the embodiment has been described with reference to the accompanying drawings, it goes without saying that the present invention is not limited to the embodiment described above. It would be obvious that a person skilled in the art could conceive of various modifications and amendments within the scope recited in the claims, and it will be understood that those modifications and amendments obviously belong to the technical scope.

In the above embodiment, the division of roles for processing performed in the player terminal 1 and the server 100 is merely an example. For example, in the above embodiment, the lottery process is executed at the server 100, but the lottery process may be executed at the player terminal 1. Also, the execution timing of the reservation lottery process in the above embodiment, i.e., the timing of determining a winning-scheduled item, is merely an example. In addition, the method of determining a winning-scheduled item is not limited to those in the above embodiment.

For example, in the above embodiment, the first time request information is received during the event holding period, three winning-scheduled items are determined by the server 100 without consuming in-game currency, and thereafter, each time a lottery game is executed, a winning-scheduled item is determined. When a lottery game is executed, the predetermined winning-scheduled item is awarded to the player as an earned item.

However, for example, in the case where a degree of rarity indicating a rarity level is set for each of the target items, a winning-scheduled degree of rarity may be determined instead of determining a winning-scheduled item itself. In this case, at the time of executing a lottery game, the lottery process may be executed so that a winning-scheduled degree of rarity is confirmed and a target item with the winning-scheduled degree of rarity is determined to be an earned item.

For example, only patterns of presentation to be executed when items, such as a big jackpot item or a small jackpot item, are earned are determined in advance to be reservation information. At this time, a big jackpot pattern, a small jackpot pattern, and a general pattern may be provided as presentation execution patterns, so that when a lottery game is executed, for example, in a state in which the presentation of the big jackpot pattern is predetermined, a big jackpot item can always be awarded to the player as an earned item.

In this manner, without determining an item itself that is awarded to the player within a predetermined number of lottery games starting with the next lottery game, other events such as presentation and item classification may be determined in advance, so that items that are awarded to the player can be determined to match these other events. In this case, it is a good idea to determine suggestion images on the basis of the predetermined other events.

In addition, the above-described embodiment has been described by way of an example where winning-scheduled items themselves are directly reported to the player by means of the first suggestion image 50*a*, the second suggestion image 50*b*, and the third suggestion image 50*c*. However, each of the first suggestion image 50*a*, the second suggestion image 50*b*, and the third suggestion image 50*c* may suggest, for example, a degree of rarity, a classification of the item, etc., instead of a winning-scheduled item itself. Thus, it is sufficient if a winning-scheduled item is suggested directly or indirectly, and the content of suggestion is not particularly limited.

In addition, the content of suggestion, i.e., the suggestion image corresponding to each winning-scheduled item, may be changed in the course of the game. For example, when a lottery game is executed and the second suggestion image 50*b* and the third suggestion image 50*c* are changed to the first suggestion image 50*a* and the second suggestion image 50*b*, respectively, the display mode may be changed. Also, the content of suggestion may be changed at various timings, such as when the box to be displayed is changed or when the screen shifts to the top screen of the lottery games. Furthermore, when the content of suggestion (suggestion image) is changed, the player may be informed in advance that the content will be changed. It is desirable that the content of suggestion be changed only when the content changed to is preferable for the player. However, the content of suggestion may also be changed to content unpreferable to the player.

Also, although four types of lottery games are provided in the above embodiment, the number of types of games is not limited to four, as long as a plurality of types of lottery games are provided. In addition, although a common in-game currency is required for a plurality of types of lottery games in the above embodiment, different in-game currencies may be required for different lottery games. Furthermore, there may be a plurality of types of in-game currencies to be consumed instead of one type, and the number of in-game currencies required may be different for each lottery game.

In addition, in the above embodiment, in each of the four types of lottery games, the lottery process for determining the same number of earned items (winning-scheduled items) as a specified number of times is executed on the basis of the player's operation. However, for example, the order in which some or all of the earned items (winning-scheduled items) in the box are awarded to the player may be preset, so that the items are awarded to the player in the preset order on the basis of the player's operation. In this case, the lottery process is not executed. Therefore, the lottery process is not essential.

More specifically, it is sufficient if: a plurality of types of earning games in each of which at least two objects are set as target objects that can be awarded to the player are displayed in a selectable manner; target objects that can be awarded to the player are displayed for each of the earning games; one of the target objects is stored, for each of the earning games, as a winning-scheduled object that is reserved to be awarded to the player; the winning-scheduled object is suggested for each of the earning games; and at least the winning-scheduled object is determined to be an object that is awarded to the player by consuming predetermined in-game currency on the basis of an input of an execution operation for selecting and executing one of the earning games.

The content and number of objects that can be won in a lottery game are not particularly limited. Thus, it is sufficient if a plurality of types of lottery games in each of which at least two objects are set as target objects that can be won in the lottery process can be selected.

In addition, the above-described embodiment has been described by way of an example where the lottery games are a so-called box gacha in which the type and number of target items are set in advance. However, it is also acceptable not to set the number of target items or the upper limit number of lottery processes in a lottery game.

In addition, the information processing program for executing the processing in the above-described embodiment may be stored in a computer-readable storage medium and may be provided in the form of a storage medium. Furthermore, a game terminal device including this storage medium may be provided. Furthermore, the embodiment described above may be an information processing method for realizing the functions and the steps shown in the flowcharts.

What is claimed is:

1. A non-transitory computer readable medium storing a program, when executed by a computer, is configured to perform a method comprising:
    displaying, on a display device of a player terminal, a user interface comprising a top screen, a menu bar, a plurality of box icons comprising a first box icon and a second box icon, and a plurality of tabs,
        wherein the first box icon corresponds to a first lottery-enabled mode for a first lottery game, and
        wherein the second box icon corresponds to a second lottery-enabled mode for a second lottery game that is different from the first lottery game;
    receiving, from a player by an input unit of the player terminal, a first player input associated with the first box icon that produces a tapped state of the first box icon,
        wherein the tapped state corresponds to a user selection of the first lottery game;
    displaying, on the display device in response to receiving the first player input associated with the first box icon, a plurality of suggestion images corresponding to a plurality of target objects that are awarded based on executing the first lottery game;
    receiving, from the player by the input unit, a second player input by the player to an execution tab among the plurality of tabs corresponding to an execution operation of the first lottery game;
    transmitting, by the player terminal and to a server over a communication network, execution information indicating the execution operation of the first lottery game;
    executing, in response to receiving the second player input and transmitting the execution information to the server, the first lottery game by consuming in-game currency associated with the player,
        wherein the in-game currency associated with the player is reduced by the server in response to receiving the execution information;
    storing a plurality of winning-scheduled objects corresponding to the plurality of target objects, wherein the plurality of winning-scheduled objects are awarded to the player according to a winning order in response to executing a plurality of lottery games;
    displaying, on the display device in response to executing the first lottery game, a lottery result screen of the user interface that indicates a first winning-scheduled object among the plurality of winning-scheduled objects that is awarded to the player based on the winning order; and
    executing, in response to the player being awarded the first winning-scheduled object, a computer game using the first winning-scheduled object.

2. The non-transitory computer readable medium according to claim 1,
    wherein a plurality of types and a number of the plurality of target objects are preset in the first lottery game, and
    one or more target objects of the plurality of types that have not been awarded to the player excluding the stored plurality of winning-scheduled objects are selected from the plurality of target objects of the first lottery game.

3. The non-transitory computer readable medium according to claim 1,
    wherein storing the plurality of winning-scheduled objects comprises:
    executing a reservation lottery process without consuming the in-game currency and selecting one or more target objects for the first lottery game in which one or more winning-scheduled objects have not been stored, and
    storing the one or more target objects selected in the reservation lottery process for at least a portion of the plurality of winning-scheduled objects.

4. The non-transitory computer readable medium according to claim 2,
    wherein storing the plurality of winning-scheduled objects comprises:
    executing a reservation lottery process without consuming the in-game currency and selecting one or more target objects for the first lottery game in which one or more winning-scheduled objects have not been stored, and
    storing the one or more target objects selected in the reservation lottery process for at least a portion of the plurality of winning-scheduled objects.

5. An information processing method comprising:
    displaying, on a display device of a player terminal, a user interface comprising a top screen, a menu bar, a plurality of box icons comprising a first box icon and a second box icon, and a plurality of tabs,
        wherein the first box icon corresponds to a first lottery-enabled mode for a first lottery game, and
        wherein the second box icon corresponds to a second lottery-enabled mode for a second lottery game that is different from the first lottery game;

receiving, from a player by an input unit of the player terminal, a first player input associated with the first box icon that produces a tapped state of the first box icon,
   wherein the tapped state corresponds to a user selection of the first lottery game;

displaying, on the display device in response to receiving the first player input associated with the first box icon, a plurality of suggestion images corresponding to a plurality of target objects that are awarded based on executing the first lottery game;

receiving, from the player by the input unit, a second player input by the player to an execution tab among the plurality of tabs corresponding to an execution operation of the first lottery game;

transmitting, by the player terminal and to a server over a communication network, execution information indicating the execution operation of the first lottery game;

executing, in response to receiving the second player input and transmitting the execution information to the server, the first lottery game by consuming in-game currency associated with the player,
   wherein the in-game currency associated with the player is reduced by the server in response to receiving the execution information;

storing a plurality of winning-scheduled objects corresponding to the plurality of target objects, wherein the plurality of winning-scheduled objects are awarded to the player according to a winning order in response to executing a plurality of lottery games;

displaying, on the display device in response to executing the first lottery game, a lottery result screen of the user interface that indicates a first winning-scheduled object among the plurality of winning-scheduled objects that is awarded to the player based on the winning order; and executing, in response to the player being awarded the first winning-scheduled object, a computer game using the first winning-scheduled object.

6. An information processing system comprising:
a server; and
a player terminal comprising a display device, an input unit, a memory, and a computer processor,
wherein the player terminal is configured to perform a first method comprising:
   displaying, on a display device of a player terminal, a user interface comprising a top screen, a menu bar, a plurality of box icons comprising a first box icon and a second box icon, and a plurality of tabs,
   wherein the first box icon corresponds to a first lottery-enabled mode for a first lottery game, and
   wherein the second box icon corresponds to a second lottery-enabled mode for a second lottery game that is different from the first lottery game;

receiving, from a player by an input unit of the player terminal, a first player input associated with the first box icon that produces a tapped state of the first box icon,
   wherein the tapped state corresponds to a user selection of the first lottery game;

displaying, on the display device in response to receiving the first player input associated with the first box icon, a plurality of suggestion images corresponding to a plurality of target objects that are awarded based on executing the first lottery game;

receiving, from the player by the input unit, a second player input by the player to an execution tab among the plurality of tabs corresponding to an execution operation of the first lottery game;

transmitting, by the player terminal and to a server over a communication network, execution information indicating the execution operation of the first lottery game;

executing, in response to receiving the second player input and transmitting the execution information to the server, the first lottery game by consuming in-game currency associated with the player;

storing a plurality of winning-scheduled objects corresponding to the plurality of target objects, wherein the plurality of winning-scheduled objects are awarded to the player according to a winning order in response to executing a plurality of lottery games;

displaying, on the display device in response to executing the first lottery game, a lottery result screen of the user interface that indicates a first winning-scheduled object among the plurality of winning-scheduled objects that is awarded to the player based on the winning order; and executing, in response to the player being awarded the first winning-scheduled object, a computer game using the first winning-scheduled object wherein the server is configured to perform a second method comprising:
   reducing the in-game currency associated with the player in response to receiving the execution information.

* * * * *